United States Patent
Basini et al.

(10) Patent No.: US 7,704,412 B2
(45) Date of Patent: *Apr. 27, 2010

(54) PROCESS FOR CATALYTIC PARTIAL OXIDATION REACTIONS

(75) Inventors: Luca Basini, Milan (IT); Alessandra Guarinoni, Piacenza (IT)

(73) Assignee: Eni S.p.A., Rome (IT)

( * ) Notice: Subject to any disclaimer, the term of this patent is extended or adjusted under 35 U.S.C. 154(b) by 1275 days.

This patent is subject to a terminal disclaimer.

(21) Appl. No.: 10/514,843

(22) PCT Filed: May 21, 2003

(86) PCT No.: PCT/EP03/05451

§ 371 (c)(1),
(2), (4) Date: May 2, 2005

(87) PCT Pub. No.: WO03/099712

PCT Pub. Date: Dec. 4, 2003

(65) Prior Publication Data

US 2005/0211604 A1    Sep. 29, 2005

(30) Foreign Application Priority Data

May 24, 2002 (IT) .......................... MI2002A1133

(51) Int. Cl.
*C01B 31/18* (2006.01)
*C01B 3/26* (2006.01)
*C01B 3/38* (2006.01)
*C07C 27/10* (2006.01)

(52) U.S. Cl. .................... 252/373; 423/418.2; 423/651; 518/702; 518/703

(58) Field of Classification Search .................. 518/702, 518/703; 252/373; 423/651, 418.2
See application file for complete search history.

(56) References Cited

U.S. PATENT DOCUMENTS 6,447,745 B1 * 9/2002 Feeley et al. ............. 423/648.1

7,368,482 B2 * 5/2008 Basini et al. ................ 518/702

FOREIGN PATENT DOCUMENTS

| EP | 0 577 879 | 1/1994 |
|---|---|---|
| JP | 09 206599 | 8/1997 |
| WO | 99/19249 | 4/1999 |
| WO | 01/51412 | 7/2001 |

OTHER PUBLICATIONS

Monnet, F. et al.: "Silicon nitride supported platinum catalysts for the partial oxidation of methane at high temperatures" Catalysis Today, vol. 64, pp. 51-58, 2001.
Wang, Dezheng et al.: "Reaction kinetics and product selectivity in the oxidation of methane over pd/Si3N4" Studies in Surface Science and Catalysis., vol. 130D, pp. 3561-3566, 2000.
Methivier C. et al.: "Pd/Si3N4 catalysts: preparation, characterization and catalytic activity for the methane oxidation" Applied Catalysis A: General., vol. 182, pp. 337-344, 1999.
U.S. Appl. No. 10/571,538, filed Mar. 10, 2006, Basini, et al.

* cited by examiner

*Primary Examiner*—James O Wilson
*Assistant Examiner*—Ebenezer Sackey
(74) *Attorney, Agent, or Firm*—Oblon, Spivak, McClelland, Maier & Neustadt, L.L.P.

(57) ABSTRACT

Partial oxidation process of liquid and/or gaseous fuels, by means of a catalytic system, preferably consisting of oxides, nitrides or oxynitrides containing one or more elements selected from Rh, Ru, Ir, Pt, Ni, Fe, Co, Cr and Cu, comprising the following steps: —premixing and, upon start-up, preheating the reagents consisting of natural gas, oxygen or air or air enriched in oxygen, optionally vapour and/or $CO_2$, to temperatures ranging from 150 to 600° C., below the flashpoint values, so that the surface rate of the reaction gases is maintained above the flame rate and the temperature of the reagent mixture in the area preceding the catalytic bed is below its flash point; —reacting the reagent mixture in the reaction zone by interaction of the catalyst, activating it at temperatures ranging from 150 to 600° C. and at space velocities ranging from 50,000 to 5,000,000 Nl reagents/L cat×h, reaching temperatures ranging from 600 to 1350° C.

19 Claims, No Drawings

PROCESS FOR CATALYTIC PARTIAL OXIDATION REACTIONS

CROSS REFERENCE TO RELATED APPLICATION

This application is a 371 of PCT/EP03/005451, filed on May 21, 2003, and claims priority to Italian Patent Application No. MI02A001133, filed on May 24, 2002.

The present invention relates to a process for the production of synthesis gas (mixtures containing $H_2$ and CO) via Catalytic Partial Oxidation (CPO) starting from a liquid and/or gaseous fuel and an oxidizing stream, consisting of oxygen, air or enriched air.

Production technologies of synthesis gas, (gas prevalently consisting of a mixture of $H_2$ and CO with smaller quantities of $H_2O$, $CO_2$ and $CH_4$, whose content varies according to the fuel used and operating conditions), and hydrogen have been developed for applications in large-scale plants dedicated, for example, to synthesis processes of methanol, ammonia and medium distillates. For these applications it is appropriate to carry out high pressure reactions in large capacity reactors.

The production technologies of synthesis gas have been continuously improved in the last sixty years and although there are numerous variations, they can be classified as technologies of:

a) non-catalytic partial oxidation (PO) of heavy hydrocarbons (Falsetti, J. S. Hydrocarbon Technology International, 1993, page 57)
b) steam and $CO_2$ reforming (SR) (Rostrup-Nielsen, J. R. "Catalytic Steam Reforming", in Catalysis Science and Technology, J. R. Anderson, M. Boudart Eds. Vol. 5, Springer, Berlin 1988, page 1)
c) autothermal reforming (ATR) (T. S. Christensen I. I. Primdahl, Hydrocarbon Processing, March, 1994, page 39).

A technology which is still not widely used, but which is frequently the object of R&S projects, is catalytic partial oxidation (CPO) with a low contact time. It allows synthesis gas to be produced from air and a large number of hydrocarbon reagents without causing the formation of byproducts consisting of carbonaceous residues or $NO_x$.

Catalytic partial oxidation with a low contact time is based on the reaction

$$C_nH_m + nO_2 = nCO + m/2 H_2 \quad \Delta H° < 0 \qquad [1]$$

Production technologies of synthesis gas with a low contact time have so far been used however for converting mixtures containing natural gas and oxygen.

We have discovered, however, process conditions and catalytic systems capable of converting not only natural but also liquefied petroleum gas (LPG), liquid hydrocarbons such as naphthas and medium distillates (also in the presence of sulfurated compounds) and oxygenated compounds such as methanol and dimethyl ether (DME), into synthesis gas.

In spite of the high costs, the use of some liquid hydrocarbons such as naphtha in the production of hydrogen/synthesis gas is not uncommon:

for producing the hydrogen necessary for refinery operations;
in places where natural gas is not easily available;
when a low $H_2$/CO ratio must be used for example in the synthesis of acetic acid or in other hydroformylation processes.

Catalytic reforming currently produces about 60% of the hydrogen necessary for refinery use and the remaining quantity is produced with steam reforming. Non-catalytic partial oxidation, on the other hand, is the preferred solution for treating heavier charges and producing synthesis gas with a low $H_2$/CO ratio for hydroformylations.

The ATR technology which uses a burner followed by a combustion chamber and a catalytic bed can however only directly treat NG with limitations on the vapour/carbon and oxygen/carbon conditions in the feeding. When NG contains high quantities of $C_2^+$ hydrocarbons, a pre-reforming passage is necessary.

Our experimentation indicates that the CPO technology has the possibility of also being used with liquid charges (naphtha also containing sulfurated compounds) and has the possibility of converting NG (also containing significant quantities of $C_2^+$) using low vapour/carbon and oxygen/carbon ratio values.

Due to its low energy consumption, low investment costs and facility of use, the CPO technology could therefore also be used for treating liquid hydrocarbons under advantageous conditions with respect to both steam reforming and non-catalytic partial oxidation.

A further use of the CPO technology is the pre-reforming of liquid hydrocarbon charges or natural gas containing high quantities of $C_2^+$ compounds. Pre-reforming carried out with $O_2$/C ratios<0.5 v/v allows $C_2^+$ hydrocarbons to be transformed into mixtures of $H_2$, $H_2O$, CO, $CO_2$ and $CH_4$ which can then also be treated by the ATR technology.

The process, object of the present invention for the partial oxidation of liquid hydrocarbon fuels, selected from gasolines, naphthas and medium distillates, and/or oxygenated products, selected from natural gas and LPG, and/or gaseous products, selected from methanol, DME and ethers, by means of a suitable catalytic system, comprises the following steps:

premixing and, upon start-up, preheating the reagents consisting of natural gas, oxygen or air or air enriched in oxygen, optionally vapour and/or $CO_2$, to temperatures ranging from 150 to 600° C., below the flash point values, so that the surface rate of the reaction gases is maintained above the flame rate and the temperature of the reagent mixture in the area preceding the catalytic bed is below its flash point;

reacting the reagent mixture in the reaction zone by interaction of the catalyst, activating it at temperatures ranging from 150 to 600° C. preferably between 250 and 450° and at space velocities ranging from 50,000 to 5,000,000 Nl reagents/L cat×h, preferably between 150,000 and 5,000,000 reaching temperatures ranging from 700 to 1350° C.

The catalytic system preferably consists of oxides, nitrides or oxynitrides containing one or more elements selected from Rh, Ru, Ir, Pt, Ni, Fe, Co, Cr and Cu.

The element, or elements, contained in the oxides or nitrides or oxynitrides is preferably in a quantity ranging from 0.05 to 15% by weight.

The materials described above have generally shown considerable resistance to thermal shock, particularly significant under the reaction activation conditions. These properties have proved to be higher than those of the oxide materials already used in CPO reactions. Furthermore these catalytic materials have shown a higher activity, or analogous however, to that of the known materials.

The ratio between the moles of steam/moles of hydrocarbon carbon atoms (steam/C) preferably ranges from 0 to 3.5, more preferably from 0.1 to 1.5, and the ratio between the moles of molecular oxygen/moles of hydrocarbon carbon atoms ($O_2$/C) preferably ranges from 0.15 to 0.7, more preferably from 0.25 to 0.65.

It has also been found that the process described above using a catalytic system preferably in the form of pellets, can give even better results when it is carried out with particular equipment, i.e. the reactor claimed by the same applicant in patent application [MI96/A000690], which allows catalytic partial oxidation reactions to be effected at high pressures (10-50 atm) and space velocities (50,000-5,000,000 Nl/kg cat/h), maintaining the linear rates of the reagent gases at values higher than the flame rates, particularly in the inlet zone of the catalytic bed, also avoiding pressure drops due to the expansion of the gaseous reaction mixture.

The equipment used substantially comprises four operating zones:
  a feeding zone (A);
  a distribution zone (B) with a constant or decreasing section along the axis of the apparatus in the gas propagation direction;
  a reaction zone (C), consisting of a catalytic bed, with an increasing section along the axis of the apparatus in the gas propagation direction, communicating with said distribution zone by means of a mutual transversal section;
  a gas expansion zone (D).

Further details on this equipment are provided both in the patent application mentioned above [MI96/A000690] and in patent application MI98A000440 filed by the same applicant.

The CPO processes according to the invention can, as specified above, be used for pre-reforming: in this case the products obtained from the catalytic partial oxidation, carried out between the reagents with an $O_2/C$ volume ratio lower than 0.5, are sent to an autothermal reforming step.

A further object of the present patent application relates to the catalytic system itself for catalytic partial oxidation reactions when this is characterized in that it consists of nitrides or oxynitrides containing an element selected from Ir and/or Pd.

The weight percentage of iridium and/or palladium preferably ranges from 0.5 to 5%.

The known catalysts can consist of oxide carriers on which noble metals such as Rh, Ru, Ir, Pt and/or transition metals such as Ni, Fe, Co, are deposited. The oxide carriers can consist of particles or monoliths with different geometrical forms such as foam or honeycomb shapes.

The known catalysts can also consist of metallic sponges, metallic particles with different geometries or metallic fibrous carriers on which the same metals are deposited.

The innovative catalysts described in the present document consist of nitrides or oxynitrides containing noble metals and other transition metals such as Rh, Ru, Ir, Pt, Ni, Fe, Co. These metals can be supported on nitride species as metallic aggregates but can also be included in the chemical formula of nitride or oxynitride.

The nitrides can consist of:
  AlN, $Co_3N$, $Cr_2N$, $Fe_4N$, $Mn_4N$, MoN, TiN, WN, VN
  silicon nitride $Si_3N_4$ (F. K. Dijen, A. Kerber, U. Voigt, W. Pfeiffer, M. Schulze, in "Key Engineering Materials" Vols. 89-91, M J. Hofmann P. F. Becher and G. Petzow Eds. TransTech. 1994, pages 19-28); H. Lange, G. Wotting H. Winter, Angew. Chem. 1991, 103, 1606)
  Si—N—B systems or Si—B—N—C systems such as $Si_3B_3N_7$ and $SiBN_3C$ (H. P. Baldus and M. Jansen, Angew. Chem. Int. Ed. Engl. 1997, 36, 328)
  systems consisting of layers of aluminum nitrides deposited on oxide carriers by means of "atomic layer epitaxy" or "chemical vapor deposition" with processes described in references ((a) M. E. Bartram, T. A. Michalscke, J. W. Rogers, T. M. Mayer Chem. Mater. 1991, 3, 353, (b) M. E. Bartram, T. A. Michalscke, J. W. Rogers, R. T. Paine. Chem. Mater. 1993, 5, 1424, (c) C. Soto, V. Boiadjiev, W. T. Tysoe, Chem. Mater. 1996, 8, 2359).

The above materials are representative of but do not limit the group of nitrides; the only limitations relate to the stability under the reaction conditions.

The systems cited above have in fact proved to have a considerable resistance to the thermal and mechanical stress which is produced during the start-up and stop reactions and also have a high thermal stability under the reaction conditions also at temperatures exceeding 1000° C.

The nitrides AlN, $CO_3N$, $Cr_2N$, $Fe_4N$, $Mn_4N$, MoN, $Si_3N_4$, TiN, WN, VN, can be prepared for example through the reactions [2-5] (The Chemistry of Transition Metal Carbides and Nitrides, S. T. Oyama Ed., Blackie Academic Professional, Glasgow, 1996)

$$M_xO+C+\tfrac{1}{2}N_2 \rightarrow M_xN+CO \qquad [2]$$

$$M+NH_3 \rightarrow MN+\tfrac{3}{2}H_2 \qquad [3]$$

$$MO+NH_3 \rightarrow MN+H_2O+\tfrac{1}{2}O_2 \qquad [4]$$

$$MCl+N_2/H_2 \rightarrow MN+HCl \qquad [5]$$

M=Al, Cr, Ti, V, Mo, Mn, Co, Fe, W

The Si—N—B and Si—B—N—C systems such as $Si_3B_3N_7$ and $SiBN_3C$ are prepared according to the reactions [6-9] (P. Baldus, M. Jansen, D. Sporn, Science 1999, 285, 699)

$$Si(CH_3)_3\text{—}NH\text{—}Si(CH_3)_3+SiCl_4 \rightarrow Si(CH_3)_3\text{—}NH\text{—}SiCl_3+Cl\text{—}Si\text{—}(CH_3) \qquad [6]$$

$$Si(CH_3)_3\text{—}NH\text{—}SiCl_3+BCl_3 \rightarrow BCl_2\text{—}NH\text{—}SiCl_3+Cl\text{—}Si\text{—}(CH_3) \qquad [7]$$

[8]

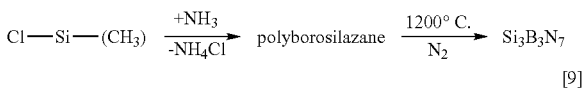

[9]

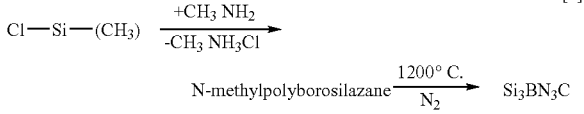

Systems consisting of layers of aluminum nitrides deposited on oxide carriers (for example $Al_2O_3$) can, on the other hand, be obtained by consecutive adsorptions of aluminum alkyls (for example $Al(CH_3)_3$) and ammonia on oxide surfaces so as to obtain the reaction [10]. (A. Dabrowski "Adsorption and its application in industry and environmental protection, Studies in Surf. Sci and Catalysis 1999, 120A, 715; C. Soto, V. Bojadjiev, W. T. Tysoe Chem. Mater. 1996, 8, 2359)

$$Al(CH_3)_3+NH_3 \rightarrow AlN+3CH_4 \qquad [10]$$

A further advantage of the nitride species consists in its having weakly basic characteristics. These characteristics are advantageous as they inhibit dehydrogenative cracking reactions of hydrocarbons.

Nitrides can contain in their molecular structure transition metals suitable for catalyzing CPO reactions with a low contact time, but these can also be deposited on their surface with different techniques.

The first technique is impregnation with solutions of inorganic salts of metals followed by drying and calcination treatment.

A second technique consists in immerging particles of nitride or oxynitride in an organic solution of an organometallic compound such as $Rh_4(CO)_{12}$, $Rh_6(CO)_{16}$, $Rh(CH_3COCHCOCH_3)_3$, $Ru_3(CO)_{12}$, $Ir_4(CO)_{12}$, $Ir(CH_3COCHCOCH_3)_3$, $Pt(CH_3COCHCOCH_3)_2$, $CO_4(CO)_{12}$, $[C_5H_5Fe(CO)_2]_2$, $Ni(CH_3COCHCOCH_3)_2$. The interaction between the organometallic molecules dissolved in the organic solvent and the active sites of the nitride or oxynitride causes its decomposition and the anchorage of the metallic species onto the surface of the solid with a very high dispersion degree. The solvent can then be removed and the solid dried. The material thus obtained can already be used in CPO reactions without any further thermal calcination treatment.

Some examples are provided which should not however be considered as limiting the scope of the present invention.

EXAMPLES 1-2

The catalytic materials were tested in a tubular reactor with an internal diameter equal to 15 mm. The reactor was made refractory and can operate at high pressures and temperatures. Two ceramic foamy monoliths were used as thermal shield to prevent heat dispersions from the reaction zone towards the gas inlet and outlet area. The reactor allowed the heat produced in the reaction and the heat dispersed to be reduced to very low values and therefore has characteristics very similar to an adiabatic reactor. Two thermocouples, co-axially positioned at the beginning and at the end of the catalytic bed with respect to the propagation of the reagents/products, allowed the temperatures of the gases at the inlet and outlet of the catalytic bed to be monitored.

The tests were carried out at pressures ranging from 1.5 to 15 ATM, by feeding heptane and air at a GHSV of 300,000 $h^{-1}$. The mixture of products was analyzed by gaschromatography; furthermore an online paramagnetic detector allowed the possible presence of oxygen in the outgoing stream to be monitored and also facilitated the start-up/shutdown operations.

The catalyst used consisted of spheres of α-alumina (particle diameter -$d_p$- equal to 1.2 mm) on which Rh species were deposited by means of a solid-liquid reaction obtained by dripping a solution of n-heptane containing $Rh_4(CO)_{12}$ onto the solids. The clusters of Rh in contact with the alumina spheres become fixed to the solid surfaces by decomposing and the phenomenon can be visually followed as it causes a discolouration of the initially reddish-orange solution. At this point, the colourless solution is eliminated and the alumina spheres containing 1% by weight of Rh, dried. The material thus obtained was charged into the reactor and used as catalyst.

Table 1 includes the inlet and outlet compositions of two reactivity tests obtained by preheating and premixing streams of air and n-heptane and sending them to the reaction zone with a stream so as to have a GHSV of 300000 $h^{-1}$.

Following the activation of the reaction and after reaching stationary reactivity conditions, $H_2S$ was added to the stream of n-heptane and air in order to obtain a concentration of sulfur in the hydrocarbon stream of 300 ppm. It is therefore possible to verify that the addition of $H_2S$ has not caused the deactivation of the catalyst.

EXAMPLES 3-4

The reactor solutions and operating conditions described in Examples 1-2 were adopted, using n-octane as hydrocarbon reagent and catalytic systems obtained by depositing 1% of Rh on a spheroidal carrier consisting of $N_4Si_3$. Also in this case, the deposition of the Rh species was obtained as described in Examples 1-2 by decomposing clusters of $Rh_4(CO)_{12}$ contained in a solution of n-heptane on the surfaces of the nitrides. After drying, the catalyst was charged into the reactor without further thermal treatment.

Table 2 contains the reactivity data obtained in two tests effected at pressures of 1.5 and 15 ATM by introducing the premixed and preheated gases into the reactors and using reagent streams so as to have a GHSV=300000 $h^{-1}$. Also in this case, after reaching stationary reactivity conditions, it was verified that neither the deactivation of the catalyst nor a variation in the reactivity characteristics had been caused by co-feeding $H_2S$ so as to obtain a concentration of 300 ppm in the hydrocarbon stream.

EXAMPLES 5-6

In these cases, the partial oxidation reactions were carried out in a refractory reactor containing a distribution zone and a catalytic zone both conical (hourglass configuration). The distribution zone has an inlet diameter of 15 mm and a height of 10 mm. The catalytic zone has an inlet diameter of 4 mm, a height of 18 mm and an outlet diameter of 20 mm. The catalytic pellets were positioned between two areas filled with ceramic material, acting as thermal shield, and consisted respectively of pellets of alpha-$Al_2O_3$ in the gas inlet zone and a ceramic monolith again of alpha-$Al_2O_3$ downstream of the catalytic bed. Two thermocouples, positioned longitudinally to the inlet and outlet of the catalytic bed, monitored the gas inlet and outlet temperature. The tests were carried out at pressures of 1.5 and 15 ATM.

The catalyst was obtained by depositing 0.5% of Ru and 0.5% of Rh onto pellets of AlN, using a solution in n-hexane of clusters of $Rh_4(CO)_{12}$ and $Ru_3(CO)_{12}$ with the procedures described in the previous examples.

The composition of the mixture of reagents and products obtained is described in Table 3.

Also in this case the introduction of 300 ppm of $H_2S$ in the hydrocarbon stream did not cause variations in the composition of the products.

EXAMPLE 7

The catalytic partial oxidation reactions were carried out in a conical reactor like that described in the previous example, using a bimetallic catalyst containing Rh (0.5% by weight) and Ru (0.5% by weight) prepared according to the procedure of Examples 5 and 6 but using as carrier particles with an average diameter of 1 mm consisting of boron nitride. Pre-reforming reactions of n-heptane were effected on this material, using a reagent mixture consisting of n-heptane and pure oxygen so as to obtain an $O_2/C$ ratio=0.3 v/v and a GHSV=400000 hours$^{-1}$.

Table 4 contains the composition of the in-going mixture and of the mixture of reaction products.

TABLE 1

|   | X moles in | 1.5 ATM X moles out | 15 ATM X moles out |
|---|---|---|---|
| 1 METHANE | 0.000 | 0.000 | 0.007 |
| 2 CO | 0.000 | 0.219 | 0.213 |
| 3 $CO_2$ | 0.000 | 0.010 | 0.012 |
| 9 $O_2$ | 0.190 | 0.000 | 0.000 |
| 10 $H_2O$ | 0.000 | 0.016 | 0.021 |
| 11 $H_2$ | 0.000 | 0.245 | 0.230 |
| 12 $N_2$ | 0.761 | 0.510 | 0.517 |
| 13 HEPTANE | 0.049 | 0.000 | 0.000 |

TABLE 2

| | X moles in | 1.5 ATM X moles out | 15 ATM X moles out |
|---|---|---|---|
| 1 METHANE | 0.000 | 0.000 | 0.005 |
| 2 CO | 0.000 | 0.218 | 0.213 |
| 3 $CO_2$ | 0.000 | 0.010 | 0.012 |
| 9 $O_2$ | 0.191 | 0.000 | 0.000 |
| 10 $H_2O$ | 0.000 | 0.018 | 0.022 |
| 11 $H_2$ | 0.000 | 0.239 | 0.228 |
| 12 $N_2$ | 0.766 | 0.514 | 0.520 |
| 14 OCTANE | 0.043 | 0.000 | 0.000 |

TABLE 3

| X moles in | 1.5 ATM X moles out | 15 ATM X moles out |
|---|---|---|
| T = 150° C. | | |
| 0.000 | 0.000 | 0.000 |
| 0.000 | 0.217 | 0.216 |
| 0.000 | 0.013 | 0.014 |
| 0.000 | 0.000 | 0.000 |
| 0.000 | 0.000 | 0.000 |
| 0.204 | 0.000 | 0.000 |
| 0.000 | 0.030 | 0.030 |
| 0.000 | 0.229 | 0.228 |
| 0.766 | 0.512 | 0.513 |
| 0.000 | 0.000 | 0.000 |
| 0.043 | 0.000 | 0.000 |

TABLE 4

| | X moles in T = 125° C. | 10 ATM X moles out T = 1267° C. |
|---|---|---|
| 1 METHANE | 0.000 | 0.397 |
| 2 CO | 0.000 | 0.447 |
| 3 $CO_2$ | 0.000 | 0.000 |
| 6 ETHANE | 0.000 | 0.004 |
| 8 PROPANE | 0.000 | 0.000 |
| 9 $O_2$ | 0.677 | 0.000 |
| 10 $H_2O$ | 0.000 | 0.000 |
| 11 $H_2$ | 0.000 | 0.152 |
| 12 $N_2$ | 0.000 | 0.000 |
| 13 HEPTANE | 0.323 | 0.000 |
| 14 OCTANE | 0.000 | 0.000 |

The invention claimed is:

1. A partial oxidation process of liquid hydrocarbon fuels comprising at least one member selected from the group consisting of gasolines, naphthas and medium distillates by a catalytic system, comprising:
   premixing and, upon start-up, preheating reagents comprising liquid hydrocarbon fuels and oxygen, air or air enriched in oxygen to temperatures ranging from 150 to 600° C., below the flash point values, so that the surface rate of the reaction gases is maintained above the flame rate and the temperature of the reagent mixture in the area preceding the catalytic system is below its flash point, thereby forming a reagent mixture;
   reacting the reagent mixture in a reaction zone and in the presence of the catalyst at temperatures ranging from 150 to 600° C. and at space velocities ranging from 50,000 to 5,000,000 Nl reagents/L cat×h, and increasing the temperature to a value ranging from 700 to 1350° C., wherein the catalytic system comprises nitrides or oxynitrides that contain a at least one metal selected from the group consisting of Rh, Ru, Ir, Pt, Ni, Fe, Co, Cr, and Cu.

2. A partial oxidation process of gaseous fuels, selected from the group consisting of natural gas and LPG, by a catalytic system comprising nitrides or oxynitrides containing at least one element selected from the group consisting of Rh, Ru, Ir, Ni, Fe, Co, Cr and Cu, comprising:
   premixing and, upon start-up, preheating the reagents comprising natural gas, oxygen, air, or air enriched in oxygen to temperatures ranging from 150 to 600° C., below the flash point values, so that the surface rate of the reaction gases is maintained above the flame rate and the temperature of the reagent mixture in the area preceding the catalytic system is below its flash point, thereby forming a reagent mixture;
   reacting the reagent mixture in the reaction zone in the presence of the catalyst and at temperatures ranging from 150 to 600° C. and at space velocities ranging from 50,000 to 5,000,000 Nl reagents/L cat×h, and increasing the temperature to a value ranging from 700 to 1350° C.

3. The process according to claim 1, wherein the at least one metal contained in the nitrides or oxynitrides is present in a quantity ranging from 0.05 to 15% by weight.

4. The process according to claim 1, wherein the reaction occurs at temperatures ranging from 250 to 450° C., whereas the space velocities range from 150,000 to 5,000,000 Nl reagents/L cat×h.

5. The process according to claim 1, wherein, between the reagents, the ratio between the moles of steam/moles of hydrocarbon carbon atoms (steam/C) ranges from 0 to 3.5 and the ratio between the moles of molecular oxygen/moles of hydrocarbon carbon atoms ($O_2$/C) ranges from 0.15 to 0.7.

6. The process according to claim 1, wherein the ratio between the moles of steam/moles of hydrocarbon carbon atoms (steam/C) ranges from 0.1 to 1.5 and the ratio between the moles of molecular oxygen/moles of hydrocarbon carbon atoms ($O_2$/C) ranges from 0.4 to 0.6.

7. A catalytic system for catalytic partial oxidation reactions comprising nitrides or oxynitrides containing Ir and Pd.

8. The catalytic system according to claim 7, wherein the weight percentage of iridium and palladium ranges from 0.5 to 5%.

9. The process according to claim 1, further comprising autothermal reforming the products obtained from the catalytic partial oxidation, effected between the reagents with an $O_2$/C volume ratio lower than 0.5.

10. The process according to claim 2, wherein the reaction occurs at temperatures ranging from 250 to 450° C., whereas the space velocities range from 150,000 to 5,000,000 Nl reagents/L cat×h.

11. The process according to claim 2, wherein, between the reagents, the ratio between the moles of steam/moles of hydrocarbon carbon atoms (steam/C) ranges from 0 to 3.5 and the ratio between the moles of molecular oxygen/moles of hydrocarbon carbon atoms ($O_2$/C) ranges from 0.15 to 0.7.

12. The process according to claim 2, wherein the ration between the moles of steam/moles of hydrocarbon carbon atoms (steam/C) ranges from 0.1 to 1.5 and the ratio between the moles of molecular oxygen/moles of hydrocarbon carbon atoms ($O_2$/C) ranges from 0.4 to 0.6.

13. The process according to claim 2, further comprising autothermal reforming the products obtained from the catalytic partial oxidation, effected between the reagents with an $O_2$/C volume ratio lower than 0.5.

14. The process according to claim 2, wherein the catalytic system further comprises nitrides or oxynitrides which contain Pt.

15. The process according to claim 2, wherein the at least one element contained in the nitrides or oxynitrides is present in a quantity ranging from 0.05 to 15% by weight.

16. The process according to claim 1, wherein the reagents further comprise vapour and $CO_2$.

17. The process according to claim 2, wherein the reagents further comprise vapour and $CO_2$.

18. The process according to claim 1, wherein the liquid hydrocarbon fuels further comprises at least one oxygenated product selected from the group consisting of methanol, DME, and ethers.

19. The process according to claim 1, wherein the catalytic system comprises at least one layer of an aluminium nitride deposited on oxide carriers.

* * * * *